United States Patent
Jameson et al.

(10) Patent No.: US 9,074,643 B2
(45) Date of Patent: Jul. 7, 2015

(54) THREE-PASS TORQUE CONVERTERS

(71) Applicant: Schaeffler Technologies GmbH & Co. KG, Herzogenaurach (DE)

(72) Inventors: Jonathan Jameson, Dalton, OH (US); Brain Zaugg, Millersburg, OH (US); Daniel Sayre, Copley, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/225,835

(22) Filed: Mar. 26, 2014

(65) Prior Publication Data

US 2014/0202819 A1    Jul. 24, 2014

Related U.S. Application Data

(62) Division of application No. 13/214,433, filed on Aug. 22, 2011, now Pat. No. 8,844,691.

(60) Provisional application No. 61/484,466, filed on May 10, 2011, provisional application No. 61/375,867, filed on Aug. 22, 2010.

(51) Int. Cl.
| | |
|---|---|
| *F16D 33/18* | (2006.01) |
| *F16H 45/02* | (2006.01) |
| *F16D 31/08* | (2006.01) |
| F16D 25/0635 | (2006.01) |

(52) U.S. Cl.
CPC ............ *F16D 31/08* (2013.01); *F16D 25/0635* (2013.01); *F16H 45/02* (2013.01); *F16H 2045/021* (2013.01); *F16H 2045/0247* (2013.01); *F16H 2045/0263* (2013.01); *F16H 2045/0278* (2013.01)

(58) Field of Classification Search
CPC ..... F16D 31/08; F16D 25/0635; F16H 45/02; F16H 2045/021; F16H 2045/0247; F16H 2045/0263; F16H 2045/0278
See application file for complete search history.

(56) References Cited

U.S. PATENT DOCUMENTS

| | | | |
|---|---|---|---|
| 3,068,974 | A | 12/1962 | Jandasek |
| 4,181,203 | A | 1/1980 | Malloy |
| 5,348,127 | A | 9/1994 | Murata |
| 5,695,028 | A | 12/1997 | Fukushima |
| 5,964,329 | A | 10/1999 | Kawaguchi et al. |
| 6,264,018 | B1 | 7/2001 | Matsuoka et al. |
| 6,343,679 | B1 | 2/2002 | Kundermann |

(Continued)

FOREIGN PATENT DOCUMENTS

| | | |
|---|---|---|
| DE | 10117746 | 11/2001 |
| JP | 58131464 | 8/1983 |
| JP | 2000 088080 | 3/2000 |

*Primary Examiner* — Jacob S Scott
(74) *Attorney, Agent, or Firm* — Kathryn A. Warner; Kevin L. Parks

(57) ABSTRACT

A torque converter comprising: a cover for receiving torque from a prime mover; an impeller fixed to the cover to form a housing for the torque converter; a turbine disposed in the housing for receiving torque from the impeller; a clutch backing plate fixed to the housing and arranged to receive a force, in an axial direction, from the turbine during operation of the torque converter; a thrust plate for thrust engagement with the clutch backing plate, and, a cover plate for driving engagement with a damper spring, wherein the thrust plate comprises the cover plate.

16 Claims, 4 Drawing Sheets

(56) References Cited

U.S. PATENT DOCUMENTS

| | | |
|---|---|---|
| 6,397,996 B1 | 6/2002 | Yabe |
| 6,575,276 B2 | 6/2003 | Fukunaga et al. |
| 6,695,110 B2 | 2/2004 | Maienschein et al. |
| 6,715,595 B2 | 4/2004 | Schmid |
| 6,742,638 B2 | 6/2004 | Maienschein et al. |
| 6,814,202 B1 | 11/2004 | Johann et al. |
| 6,840,363 B2 | 1/2005 | Braford et al. |
| 6,851,532 B2 | 2/2005 | Back et al. |
| 6,926,131 B1 | 8/2005 | Arhab et al. |
| 7,000,747 B2 | 2/2006 | Back et al. |
| 7,264,101 B2 | 9/2007 | Hauck et al. |
| 7,588,130 B2 | 9/2009 | Heuler et al. |
| 7,891,473 B2 | 2/2011 | Maienschein et al. |
| 8,051,964 B2 | 11/2011 | Olsen et al. |
| 2004/0050639 A1 | 3/2004 | Back et al. |
| 2005/0056512 A1 | 3/2005 | Sasse et al. |
| 2007/0251788 A1 | 11/2007 | Heck et al. |
| 2008/0000745 A1 | 1/2008 | Swank et al. |
| 2008/0277223 A1 | 11/2008 | Liang et al. |
| 2008/0277227 A1 | 11/2008 | Jameson et al. |

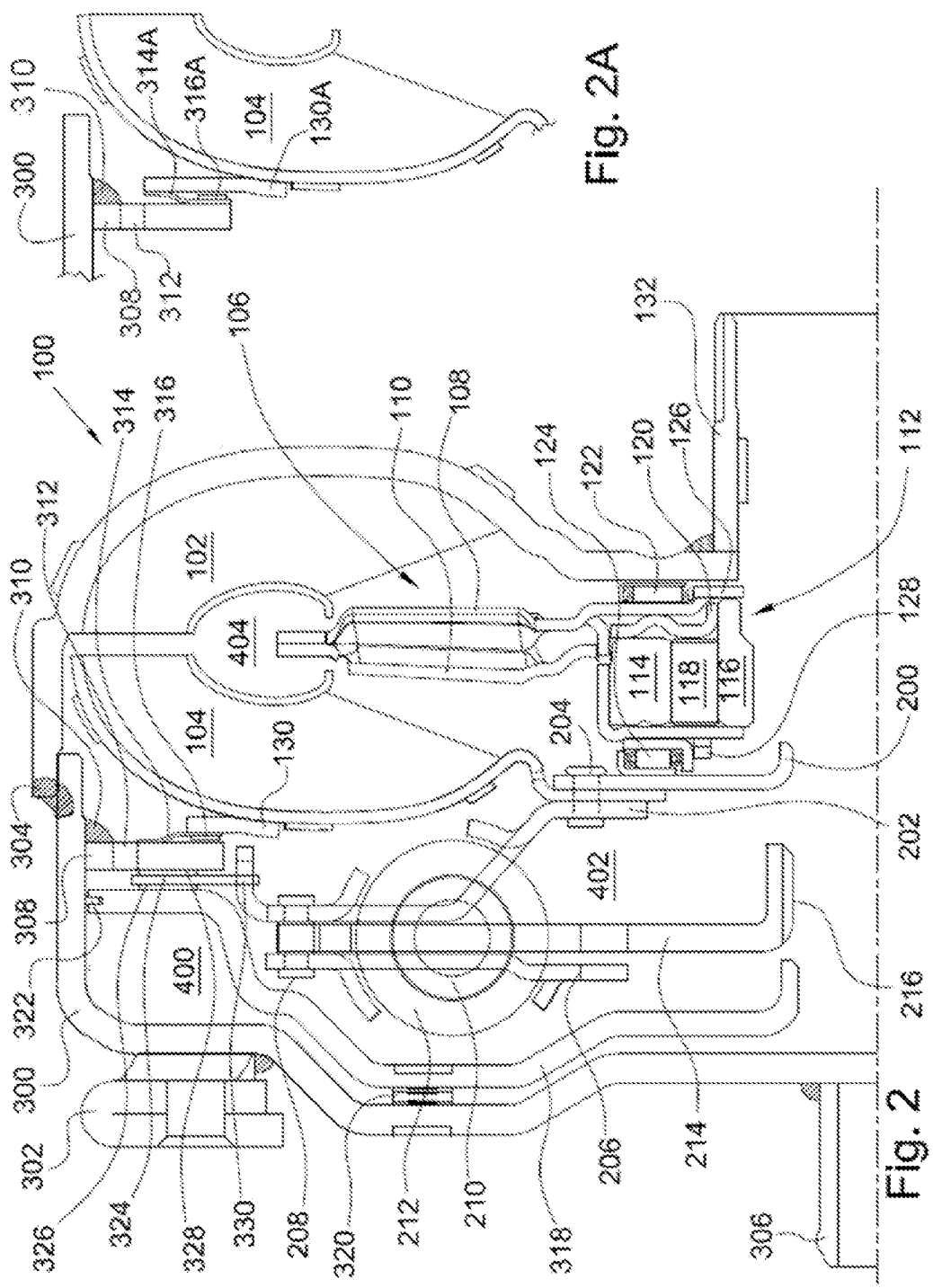

THREE-PASS TORQUE CONVERTERS

CROSS-REFERENCE TO RELATED APPLICATIONS

This application is a divisional of application Ser. No. 13/214,433, filed on Aug. 22, 2011, which claims the benefit of U.S. Provisional Application No. 61/484,466 filed on May 10, 2011 and U.S. Provisional Application No. 61/375,867 filed on Aug. 22, 2010, which applications are incorporated herein by reference.

FIELD

The invention relates generally to a torque converter, and more specifically to a torque converter arranged for operation in a three-pass transmission.

BACKGROUND

Torque converters for three-pass transmissions are known. One example is shown in commonly assigned United States Patent Publication No. 2008/0277223. In known converter designs, turbine thrust loads, that is, the thrust force in the turbine acting towards the cover as a result of hydrodynamic pressure in the torus, is generally reacted by a turbine hub and a bearing or bushing.

BRIEF SUMMARY

Example aspects broadly comprise a torque converter including a cover for receiving torque from a prime mover, an impeller fixed to the cover to form a housing for the torque converter, a turbine disposed in the housing for receiving torque from the impeller, and a clutch backing plate fixed to the housing and arranged to receive a force, in an axial direction, from the turbine during operation of the torque converter. In some example embodiments, the turbine includes a thrust plate for thrust engagement with the clutch backing plate. In an example embodiment, the turbine includes a turbine shell and the thrust plate is attached to the turbine shell.

In some example embodiments, the torque converter includes a cover plate for driving engagement with a damper spring and the thrust plate includes the cover plate. In some example embodiments, the turbine has a turbine shell and the cover plate is fixed to the turbine shell. In some example embodiments, the torque converter includes a sealing plate fixed to the turbine shell and the cover plate at a first diameter, and pressingly engaged with the cover plate at a second diameter, different than the first diameter. In an example embodiment, the torque converter includes a sealing plate fixed to the cover plate and pressingly engaged with the clutch backing plate axially between the cover plate and the clutch backing plate.

In some example embodiments, the torque converter has a centering plate and the turbine includes a turbine shell. The centering plate is fixed to the turbine shell, the cover plate is axially retained by the turbine shell and the centering plate, and the cover plate is at least partially rotatable relative to the turbine. In some example embodiments, the torque converter has a sealing plate fixed to the turbine shell and pressingly engaged with the cover plate. In an example embodiment, the torque converter includes a sealing plate fixed to the cover plate and pressingly engaged with the clutch backing plate axially between the cover plate and the clutch backing plate.

Other example aspects broadly comprise a torque converter including a housing, a piston plate, a clutch backing plate fixed to the housing, a turbine, a thrust plate for transmitting axial force from the turbine to the clutch backing plate, and a clutch. The converter also has a first hydraulic chamber at least partially defined by the housing and the piston plate for engaging the clutch, a second hydraulic chamber at least partially defined by the piston plate, the clutch backing plate, and the thrust plate, and a third hydraulic chamber at least partially defined by the clutch backing plate, the thrust plate, and the housing. In an example embodiment, one of the second or third hydraulic chambers is for introducing a cooling flow to the clutch, and the other of the second or third hydraulic chambers is for receiving a cooling flow from the clutch.

In some example embodiments, the clutch backing plate includes an orifice for exchanging fluid between the second and third hydraulic chambers. In some example embodiments, the torque converter has a sealing plate partially dividing the second and third hydraulic chambers. In some example embodiments, the sealing plate includes an annular friction material ring for sealing engagement with the clutch backing plate. In an example embodiment, the sealing plate is fixed to the clutch backing plate and pressingly engaged with the thrust plate.

In some example embodiments, the sealing plate is fixed to the thrust plate and pressingly engaged with the clutch backing plate. In an example embodiment, the torque converter includes a cover plate and a sealing plate. The thrust plate includes the cover plate and the sealing plate is fixed to the cover plate at a first diameter, and pressingly engaged with the cover plate at a second diameter, different than the first diameter.

Other example aspects broadly comprise a torque converter assembly including a cover assembly with a clutch backing plate, for receiving torque from an engine, an impeller assembly fixed to the cover assembly to form a housing for the torque converter, a stator for multiplying torque, and a turbine assembly. The torque converter also includes a thrust plate for transmitting axial force from the turbine assembly to the clutch backing plate and a damper assembly for transmitting torque to a transmission input shaft. In some example embodiments, the damper assembly includes a cover plate drivingly engaged with the turbine assembly and a flange including a hub for driving engagement with the input shaft, and the turbine assembly has a centering plate for centering the turbine assembly relative to the input shaft. In an example embodiment, the centering plate centers the turbine assembly relative to the flange hub.

BRIEF DESCRIPTION OF THE DRAWINGS

The nature and mode of operation of the present invention will now be more fully described in the following detailed description taken with the accompanying drawing figures, in which:

FIG. 2 is a top-half cross section of a three-pass torque converter with a turbine damper according to an example aspect;

FIG. 2A is partial view of the three-pass torque converter of FIG. 2 showing an alternative thrust plate configuration;

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
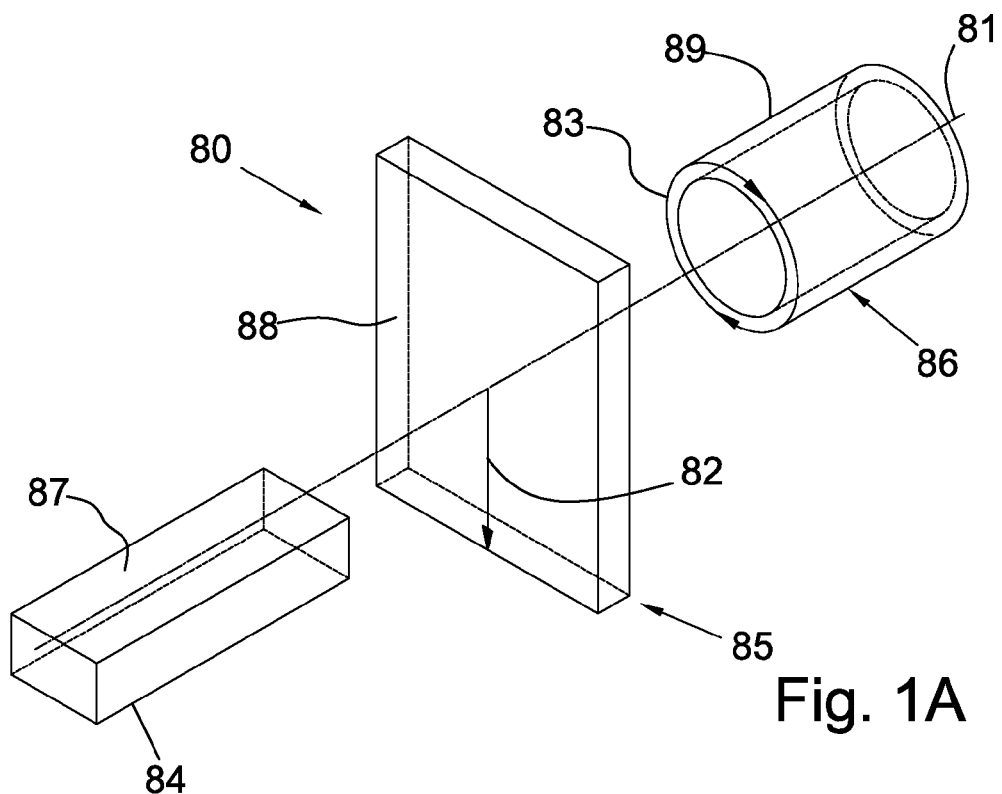
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
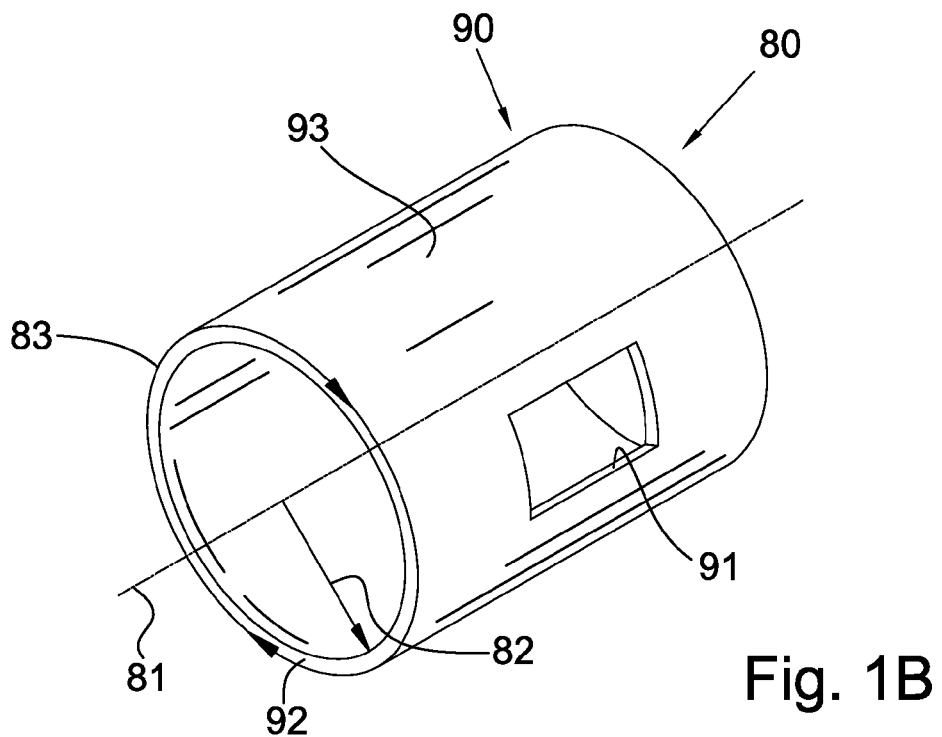
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIG. 2. FIG. 2 is a top-half cross section of three-pass torque converter 100 with a turbine damper. Torque converter 100 includes impeller 102, turbine 104, and stator 106. Stator 106 is for multiplying torque as is commonly known in the art. In the example embodiment shown in FIG. 2, stator 106 is a stamped stator with plates 108 and 110. One-way clutch 112 includes outer race 114, inner race 116, and rollers 118. Outer race 114 is drivingly engaged with plate 108. Race 114 may be press-fit into plate 108, for example. Inner race 116 is axially retained between plates 108 and 110, and centered by axial extension 120 of plate 110. Stator 106 is axially retained between bearings 122 and 124. Plate 108 includes centering features 126 and 128 for centering bearings 122 and 124, respectively.

Centering plate 200 and cover plate 202 are attached to turbine 104 by rivet 204. In an example embodiment, plates 200 and 202 are attached to a shell of turbine 104. Cover plate 202 is attached to cover plate 206 via rivet 208. Springs 210 and 212 are in a torque flow between cover plates 202 and 206, and flange 214. Flange 214 is drivingly engaged with an input shaft (not shown) for a transmission at spline 216.

Torque converter cover 300 is drivingly engaged with an engine or prime mover (not shown) at lugs 302. During operation of torque converter 100, cover 300 receives torque from the engine. Lugs 302 may be a formed from folded sheet metal. Cover 300 is drivingly engaged with impeller 102 at weld 304. That is, impeller 102 and cover 300 are fixed together to form a housing for the torque converter. Pilot 306 centers torque converter 100 in a crankshaft (not shown) for the engine.

Clutch backing plate 308 is fixed to the housing. In the example embodiment shown in FIG. 2, clutch backing plate 308 is fixed to cover 300 by weld 310. Plate 308 includes orifice 312 and sealing plate 314 with friction material ring 316 to control oil flow as described below. Turbine 104 is disposed in the housing and includes thrust plate 130 so that an axial thrust force of turbine 104 is reacted through, or received by, clutch backing plate 308 and sealing plate 314. Otherwise stated, thrust plate 130 is arranged for thrust engagement with clutch backing plate 308. By thrust engagement, we mean that the components are arranged for axial force transmission between the components. Thrust plate 130 may be attached to a shell of turbine 104, for example.

The following description is made with reference to FIG. 2A. FIG. 2A is partial view of three-pass torque converter 100 showing an alternative thrust plate configuration. Plate 130 includes sealing plate 314A with friction material ring 316A. That is, sealing plate 314A is fixed to thrust plate 130A and pressingly engaged with clutch backing plate 308.

Returning to FIG. 2, piston plate 318 is drivingly engaged with cover 300 through leaf spring 320 attached to cover 300 and piston plate 318 through respective extruded rivets as is commonly known in the art. Piston plate 318 is sealed to cover 300 at seal 322. Seal 322 may be a dynamic, Teflon® seal, for example. Clutch plate 324 includes friction material rings 326 and 328, and is drivingly engaged with cover plate 202 at tabs 330.

In converter mode, torque received by cover 300 is transferred from impeller 102 to turbine 104, and multiplied through stator 106. Torque from turbine 104 is transmitted through cover plates 202 and 206, through springs 210 and 212, and flange 214, to the transmission input shaft. Otherwise stated, plates 202 and 206, and flange 214, are drivingly engaged with damper springs 210 and 212. In lockup mode, torque received by cover 300 is transferred through clutch backing plate 308 and piston 318, through clutch plate 324, cover plates 202 and 206, springs 210 and 212, and flange 214 to the input shaft.

Lockup mode is initiated when pressure is introduced in chamber 400 between cover 300 and piston 318, urging piston 318 towards clutch backing plate 308 to clamp clutch plate 324. Piston 318 is sealed to cover 300 at seal 322, so no cooling flow is available from the apply pressure to cool the clutch during slipping operation. Sealing plate 314 and friction material ring 316 divide the portion of converter 100 between piston 318 and impeller 102 into chambers 402 and 404 when thrust from turbine 104 urges thrust plate 130 towards clutch backing plate 308. Cooling flow introduced into chamber 402 must pass through grooves (not shown) in friction material rings 326 and 328 and through orifice 312 to flow out of converter 100 through chamber 404, or vice versa. Therefore, clutch plate 324 is supplied with cooling flow during slipping operation. Chambers 400, 402 and 404 are further divided by seals (not shown) between the input shaft and piston 318, sealing plate 200, and impeller hub 132.

Figure 3:
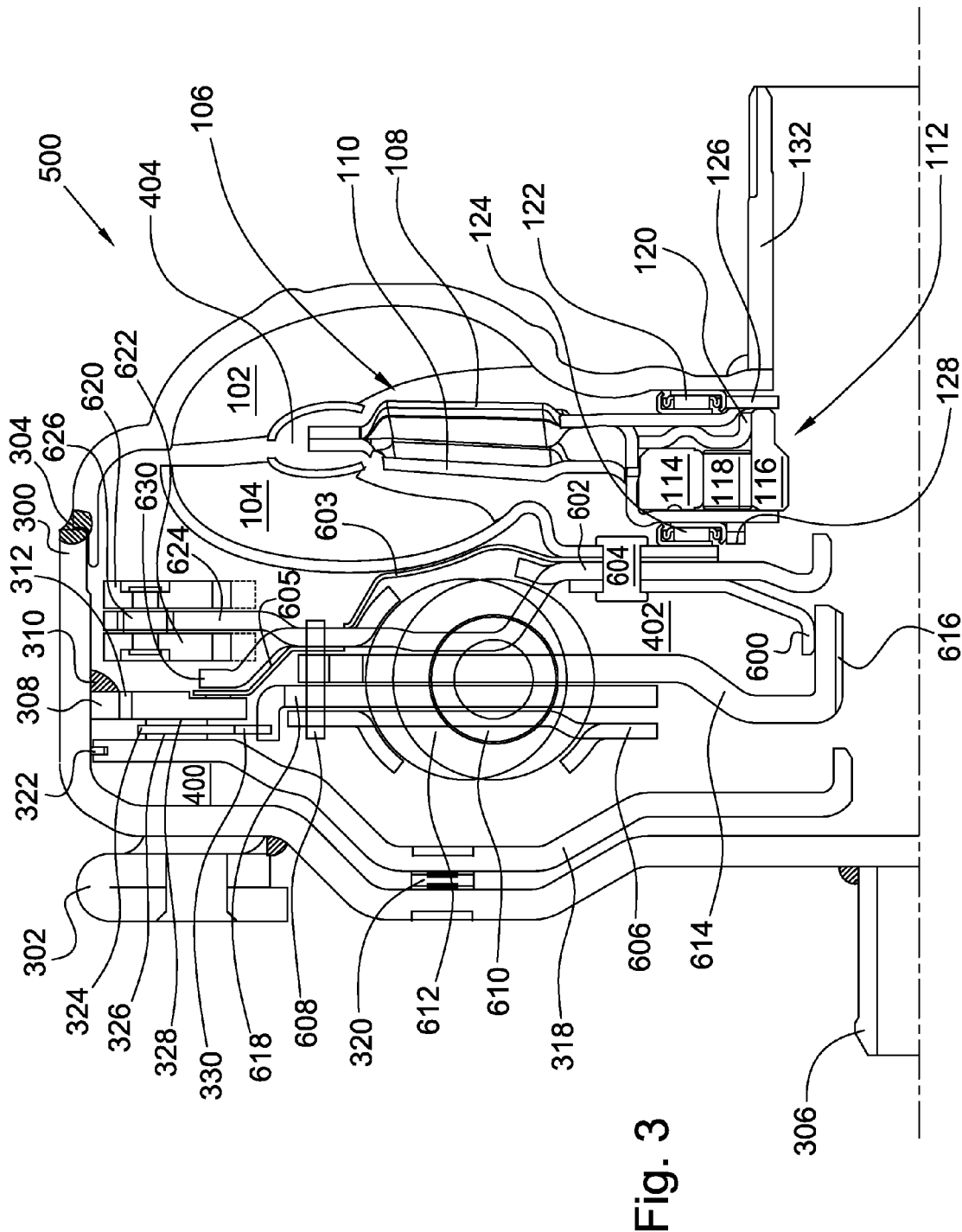
FIG. 3 is a top-half cross section of a three-pass torque converter with a pendulum damper according to an example aspect.

The following description is made with reference to FIG. 3. FIG. 3 is a top-half cross section of three-pass torque converter 500 with a pendulum damper. Torque converter 500 includes impeller 102, turbine 104, and stator 106. In the example embodiment shown in FIG. 3, stator 106 is a stamped stator with plates 108 and 110. One-way clutch 112 includes outer race 114, inner race 116, and rollers 118. Outer race 114 is drivingly engaged with plate 108. Race 114 may be press-fit into plate 108, for example. Inner race 116 is axially retained between plates 108 and 110, and centered by axial extension 120 of plate 110. Stator 106 is axially retained between bearings 122 and 124. Plate 108 includes centering features 126 and 128 for centering bearings 122 and 124, respectively.

Centering plate 600, cover plate 602, and sealing plate 603 are attached to turbine 104 by rivet 604. Centering plate 600 centers turbine 104 relative to the input shaft. In an example embodiment, plate 600 centers turbine 104 on a hub portion of flange 614. Sealing plate 603 is pressingly engaged with cover plate 602 radially outside of attachment at rivet 604. By pressingly engaged, we mean that plate 603 is pressed against plate 602 when plate 603 is fixed to the turbine 104 by rivet 604. Otherwise stated, plate 603 is installed in a deflected state to aid sealing with plate 602.

Cover plate 602 and sealing plate 605 are attached to cover plate 606 via rivet 608. Sealing plate 605 is pressingly engaged with clutch backing plate 308. That is, in the absence of hydraulic pressure in converter 500, plate 605 is slightly deformed and pressed tightly against clutch backing plate 308. Rivet 608 may be a sheet metal rivet, for example. Springs 610 and 612 are in a torque flow between cover plates 602 and 606, and flange 614. Flange 614 is drivingly engaged with an input shaft (not shown) for a transmission at spline 616. An additional set of springs (not shown) are radially aligned and circumferentially offset from springs 610 and 612, and disposed in a torque path between drive plate 618 and cover plates 602 and 606. Pendulum masses 620 and 622 are swingly engaged with radial extension 624 of cover plate 602 by rollers 626.

Torque converter cover 300 is drivingly engaged with an engine (not shown) at lugs 302. Lugs 302 may be a formed from folded sheet metal. Cover 300 is drivingly engaged with impeller 102 at weld 304. Pilot 306 centers torque converter 100 in a crankshaft (not shown) for the engine. Clutch backing plate 308 is fixed to cover 300 by weld 310, for example. Plate 308 includes orifice 312 to control oil flow as described below. Cover plate 602 includes thrust portion 630 so that an axial thrust force of turbine 104 is reacted through clutch backing plate 312 and sealing plate 605.

Piston plate 318 is drivingly engaged with cover 300 through leaf spring 320 attached to cover 300 and piston plate 318 through respective extruded rivets as is commonly known in the art. Piston plate 318 is sealed to cover 300 at seal 322. Seal 322 may be a dynamic, Teflon® seal, for example. Clutch plate 324 includes friction material rings 326 and 328, and is drivingly engaged with drive plate 618 at tabs 330.

In converter mode, torque received by cover 300 is transferred from impeller 102 to turbine 104, and multiplied through stator 106. Torque from turbine 104 is transmitted through cover plates 602 and 606, through springs 610 and 612, and flange 614, to the transmission input shaft. In lockup mode, torque received by cover 300 is transferred through clutch backing plate 308 and piston 318, through clutch plate 324, drive plate 618, springs (not shown), cover plates 602 and 606, springs 610 and 612, and flange 614 to the input shaft. Pendulum masses 620 and 622 operate on plate 602 to reduce fluctuations as is commonly known in the art.

Lockup mode is initiated when pressure is introduced in chamber 400 between cover 300 and piston 318, urging piston 318 towards clutch backing plate 308 to clamp clutch plate 324. Piston 318 is sealed to cover 300 at seal 322, so no cooling flow is available from the apply pressure to cool the clutch during slipping operation. Sealing plate 605, cover plate 602, and sealing plate 603 divide the portion of converter 500 between piston 318 and impeller 102 into chambers 402 and 404. Cooling flow introduced into chamber 402 must pass through grooves (not shown) in friction material rings 326 and 328 and through orifice 312 to flow out of converter 500 through chamber 404, or vice versa. Therefore, clutch plate 324 is supplied with cooling flow during slipping operation. Chambers 400, 402 and 404 are further divided by seals (not shown) between the input shaft and piston 318, cover plate 602, and impeller hub 132.

Figure 4:
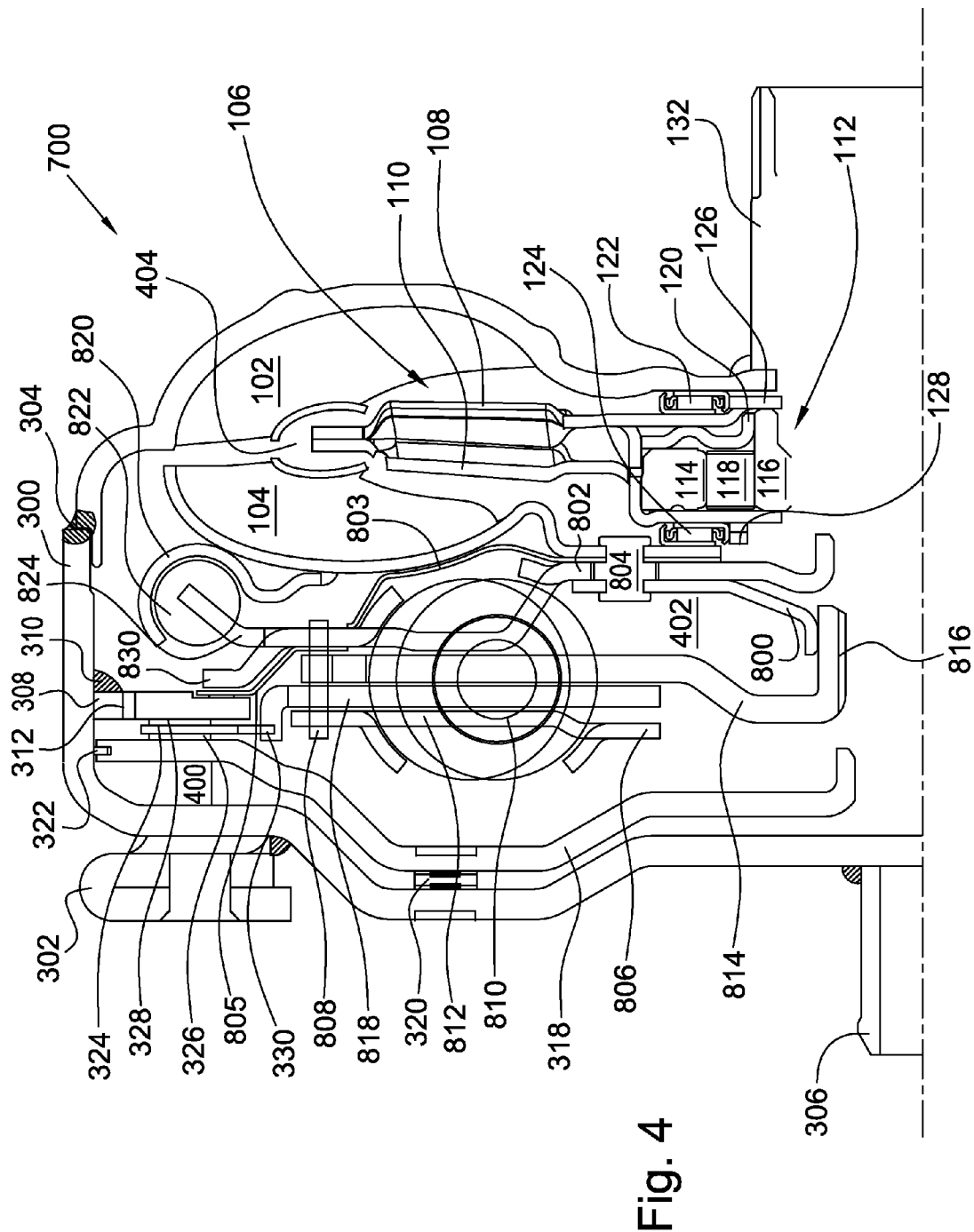
FIG. 4 is a top-half cross section of a three-pass torque converter with a tilger damper according to an example aspect.

The following description is made with reference to FIG. 4. FIG. 4 is a top-half cross section of three-pass torque converter 700 with a tilger damper. Torque converter 700 includes impeller 102, turbine 104, and stator 106. In the example embodiment shown in FIG. 4, stator 106 is a stamped stator with plates 108 and 110. One-way clutch 112 includes outer race 114, inner race 116, and rollers 118. Outer race 114 is drivingly engaged with plate 108. Race 114 may be press-fit into plate 108, for example. Inner race 116 is axially retained between plates 108 and 110, and centered by axial extension 120 of plate 110. Stator 106 is axially retained between bearings 122 and 124. Plate 108 includes centering features 126 and 128 for centering bearings 122 and 124, respectively.

Centering plate 800 and sealing plate 803 are attached to turbine 104 by spacer rivet 804. Cover plate 802 is engaged with turbine 104 with rotational lash through spacer rivet 804. That is, cover plate 802 is axially retained by turbine 104 and plate 800, and is at least partially rotatable relative to turbine 104. Cover plate 802 and sealing plate 805 are attached to cover plate 806 via rivet 808. Rivet 808 may be a sheet metal rivet, for example. Springs 810 and 812 are in a torque flow between cover plates 802 and 806, and flange 814. Flange 814 is drivingly engaged with an input shaft (not shown) for a transmission at spline 816. An additional set of springs (not shown) are radially aligned and circumferentially offset from springs 810 and 812, and disposed in a torque path between drive plate 818 and cover plates 802 and 806. Spring retainer 820 is fixedly attached to turbine 104.

Spring 822 operates between radial extension 824 of cover plate 802 and retainer 820 in a tilger configuration. That is, spring 822 is tuned so that, during a lock-up mode of torque converter 700, a mass of turbine 104 oscillates out of phase with cover plate 802 to damp a natural frequency of cover plate 802. The tilger configuration improves noise, vibration, and harshness (NVH) performance of torque converter 700.

Torque converter cover 300 is drivingly engaged with an engine (not shown) at lugs 302. Lugs 302 may be a formed from folded sheet metal. Cover 300 is drivingly engaged with impeller 102 at weld 304. Pilot 306 centers torque converter 100 in a crankshaft (not shown) for the engine. Clutch backing plate 308 is fixed to cover 300 by weld 310, for example. Plate 308 includes orifice 312 to control oil flow as described below. Cover plate 802 includes thrust portion 830 so that an axial thrust force of turbine 104 is reacted through clutch backing plate 308 and sealing plate 605.

Piston plate 318 is drivingly engaged with cover 300 through leaf spring 320 attached to cover 300 and piston plate 318 through respective extruded rivets as is commonly known in the art. Piston plate 318 is sealed to cover 300 at seal 322. Seal 322 may be a dynamic, Teflon® seal, for example. Clutch plate 324 includes friction material rings 326 and 328, and is drivingly engaged with drive plate 818 at tabs 330.

In converter mode, torque received by cover 300 is transferred from impeller 102 to turbine 104, and multiplied through stator 106. When travel exceeds lash in connection at spacer rivet 804, torque from turbine 104 is transmitted through cover plates 802 and 806, through springs 810 and 812, and flange 814, to the transmission input shaft. In lockup mode, torque received by cover 300 is transferred through clutch backing plate 308 and piston 318, through clutch plate 324, drive plate 818, springs (not shown), cover plates 802 and 806, springs 810 and 812, and flange 814 to the input shaft. Spring 822 and lash enabled by spacer rivet 804 allow swinging of turbine 104 to reduce fluctuations as is commonly known in the art.

Lockup mode is initiated when pressure is introduced in chamber 400 between cover 300 and piston 318, urging piston 318 towards clutch backing plate 308 to clamp clutch plate 324. Piston 318 is sealed to cover 300 at seal 322, so no cooling flow is available from the apply pressure to cool the clutch during slipping operation. Sealing plate 805, cover plate 802, and sealing plate 803 divide the portion of converter 700 between piston 318 and impeller 102 into chambers 402 and 404. Otherwise stated, chamber 402 is at least partially defined by piston 318, backing plate 308, and thrust plate 830, and chamber 404 is at least partially defined by backing plate 308, thrust plate 830 and the housing formed by cover 300 and impeller 102.

Cooling flow introduced into chamber 402 must pass through grooves (not shown) in friction material rings 326 and 328 and through orifice 312 to flow out of converter 700 through chamber 404, or vice versa. Orifice 312 is for exchanging fluid between chambers 402 and 404. Therefore, clutch plate 324 is supplied with cooling flow during slipping operation. In an example embodiment, chamber 402 is for introducing a cooling flow to the clutch, and chamber 404 is for receiving cooling flow from the clutch. In an example embodiment, chamber 404 is for introducing a cooling flow to the clutch, and chamber 402 is for receiving cooling flow from the clutch. Chambers 400, 402 and 404 are further divided by seals (not shown) between the input shaft and piston 318, cover plate 802, and impeller hub 132.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A torque converter comprising:
 a cover for receiving torque from a prime mover;
 an impeller fixed to the cover to form a housing for the torque converter;
 a turbine disposed in the housing for receiving torque from the impeller;
 a clutch backing plate fixed to the housing and arranged to receive a force, in an axial direction, from the turbine during operation of the torque converter;
 a thrust plate for thrust engagement with the clutch backing plate, and,
 a cover plate for driving engagement with a damper spring, wherein the thrust plate comprises the cover plate.

2. The torque converter of claim 1, wherein the turbine comprises a turbine shell and the cover plate is fixed to the turbine shell.

3. The torque converter of claim 2 further comprising a first sealing plate fixed to the turbine shell and the cover plate at a first diameter, and pressingly engaged with the cover plate at a second diameter, different than the first diameter.

4. The torque converter of claim 3 further comprising a second sealing plate fixed to the cover plate and pressingly engaged with the clutch backing plate axially between the cover plate and the clutch backing plate.

5. The torque converter of claim 1 further comprising a centering plate, wherein the turbine comprises a turbine shell, the centering plate is fixed to the turbine shell, the cover plate is axially retained by the turbine shell and the centering plate, and the cover plate is at least partially rotatable relative to the turbine.

6. The torque converter of claim 5 further comprising a first sealing plate fixed to the turbine shell and pressingly engaged with the cover plate.

7. The torque converter of claim 6 further comprising a second sealing plate fixed to the cover plate and pressingly engaged with the clutch backing plate axially between the cover plate and the clutch backing plate.

8. A torque converter comprising:
 a housing;
 a piston plate;
 a clutch backing plate fixed to the housing;
 a turbine;
 a thrust plate for transmitting axial force from the turbine to the clutch backing plate including a cover plate;
 a clutch;
 a sealing plate fixed to the cover plate at a first diameter and pressingly engaged with the cover plate at a second diameter, different than the first diameter;
 a first hydraulic chamber at least partially defined by the housing and the piston plate for engaging the clutch;
 a second hydraulic chamber at least partially defined by the piston plate, the clutch backing plate, the thrust plate, and the sealing plate; and,
 a third hydraulic chamber at least partially defined by the clutch backing plate, the thrust plate, the sealing plate, and the housing.

9. The torque converter of claim 8, wherein one of the second or third hydraulic chambers is for introducing a cooling flow to the clutch, and the other of the second or third hydraulic chambers is for receiving a cooling flow from the clutch.

10. The torque converter of claim 8, wherein the clutch backing plate includes an orifice for exchanging fluid between the second and third hydraulic chambers.

11. The torque converter of claim 8 further comprising a second sealing plate including an annular friction material ring partially dividing the second and third hydraulic chambers.

12. The torque converter of claim 11 wherein the second sealing plate is fixed to the clutch backing plate and pressingly engaged with the thrust plate.

13. The torque converter of claim 11 wherein the second sealing plate is fixed to the thrust plate and pressingly engaged with the clutch backing plate.

14. A torque converter assembly comprising:
   a cover assembly including a clutch backing plate, for receiving torque from an engine;
   an impeller assembly fixed to the cover assembly to form a housing for the torque converter;
   a stator for multiplying torque;
   a turbine assembly comprising a centering plate for centering the turbine assembly relative to a transmission input shaft;
   a thrust plate for transmitting axial force from the turbine assembly to the clutch backing plate;
   a cover plate drivingly engaged with the turbine assembly;
   a damper assembly for transmitting torque to the input shaft; and,
   a flange including a hub for driving engagement with the input shaft, wherein the centering plate centers the turbine assembly relative to the flange hub.

15. The torque converter assembly of claim 14, wherein the damper assembly comprises a pendulum damper.

16. The torque converter assembly of claim 14, wherein the damper assembly comprises a tilger damper.

* * * * *